United States Patent Office 3,474,056
Patented Oct. 21, 1969

3,474,056
CURING AGENTS FOR POLYEPOXIDES
Rudolf Schneider, Vienna, Austria, and Jochen Meiners, Unna-Konigsborn, Germany, assignors to Schering Aktiengesellschaft, Berlin, Germany
No Drawing. Continuation-in-part of application Ser. No. 263,756, Mar. 8, 1963. This application May 12, 1967, Ser. No. 637,909
Claims priority, application Austria, Mar. 20, 1962, A 2,293/62
Int. Cl. C08g 30/14
U.S. Cl. 260—18    10 Claims

ABSTRACT OF THE DISCLOSURE

Adducts consisting of polyepoxide resins and a stoichiometric excess amount of a poly-amino-amide or poly-amino-imidazoline are used for curing (i.e., hardening) polyepoxide resins. Poly-amino-amide or poly-amino-imidazoline is reacted with a polyepoxide in order to form the adduct which is intimately mixed with the polyepoxide to be hardened at ordinary room temperature or at elevated temperature. The adducts can be used in solution or in dispersion, the liquid adducts in mixtures with liquid polyepoxides without solvents. The mixtures of pulverized adducts with pulverized polyepoxide resins are stable on storage and can be hardened by heat.

---

This application is a continuation-in-part of Ser. No. 263,756 filed Mar. 8, 1963 now abandoned.

Curable or hardenable systems on the basis of polyepoxides have been known, which are hardened or cured by means of adducts from polyepoxides and polyamines. Such systems exhibit a series of disadvantages.

Adducts from poly-amino-amides or poly-amino-imidazolines and polyepoxides have not been known from the prior art. The subject-matter of this invention are curing agents for polyepoxides, said curing agents being characterized by a content of adducts from polyepoxides and an excess of poly-amino-amides and/or poly-amino-imidazolines.

Particularly valuable adducts are obtained from poly-amino-amides and/or poly-amino-imidazolines, which are based on saturated and/or unsaturated monovalent natural fatty acids, on polymeric particularly dimeric and co-polymeric fatty acids, on dicarboxylic acids obtained by carboxylation of unsaturated monovalent natural fatty acids or are based on such polycarboxylic acids, which are obtainable by the addition of di- or tricarboxylic acids, or their derivatives, particularly maleic acid anhydrides, to natural unsaturated fatty acids.

The curing or hardening agents embodying the present invention are soluble in the conventional lacquer solvents. If the adducts are solid, they are fusible and they can be applied in various manners. For coating materials which are free from solvents, or poor in solvents, as well as for coating materials dispersed in water, hardening agents have to be added in liquid form, while for coating systems containing solvents, preferably the solid adducts offer themselves. Furthermore, the solid curing agents based on the present invention can be also used in pulverized form in combination with solid, pulverized polyepoxides as coating and adhesive materials. Such mixtures are stable in storage and processed with application of heat.

The poly-amino-amides and poly-amino-imidazolines to be used for preparing the adducts according to this invention are compounds known by themselves, which are prepared by condensation of the acid component with excess amounts of polyalkylene polyamines, particularly polyethylene-polyamines. As examples of acids which can be used, the following are mentioned: palmitic acid, stearic acid, oleic acid, elaidic acid, linoleic acid, linolenic acid, dehydrated castor oil fatty acid, elaostearic acid, or their mixtures. The polymeric fatty acids to be used can be prepared from natural fatty acids having one or more unsaturations, by thermal or catalytic polymerization or by copolymerization in the presence of polymerizable compounds, such as styrene, or homologues, cyclopentadiene, and the like. Carboxylation of the unsaturated fatty acids has been likewise known and results in the case of oleic acid in a dicarboxylic acid having 19 C atoms. Other polycarboxylic acids are those which can be prepared by the addition of di- or tricarboxylic acids or their derivatives, particularly maleic acid anhydride to unsaturated fatty acid, particularly oleic acid.

Polyepoxides adapted to be used in carrying out the invention are those which contain more than one epoxide group in the molecule and which can be hardened also by means of poly-amino-amides or poly-amino-imidazolines. In this connection the known polyglycidethers of aromatic and aliphatic polyvalent hydroxyl-compounds, such as for example, resorcin, pyrocatechin, hydroquinone, bis-(4-hydroxyphenyl)-dimethyl-methane, dihydroxy-diphenyl, dihydroxydiphenylsulfone, dihydroxydiphenylsulfide, and also glycerol, pentaerythrite, mannitol, sorbite, trimethylolpropane, are mentioned. Particularly suitable are polyepoxides which are obtained by condensation of diphenylolpropane and epichlorhydrin, as well as those based on phenol-formaldehyde condensates and epichlorhydrin. Likewise suitable are polyepoxide compounds which have been known in great number and are obtained by epoxidation of aliphatic and/or cyclo-aliphatic polyolefins.

The polyepoxides mentioned by way of example can be used for hardenable combinations with the adducts according to this invention, as well as for the preparation of these adducts proper. Thereby, for both purposes the same or different polyepoxides can be used.

In the preparation of adducts according to this invention, the proportions between polyepoxides on the one hand and poly-amino-amides and/or poly-amino-imidazolines on the other hand can be varied within wide limits. For one equivalent of the poly-amino-amide or poly-amino-imidazoline preferably ¼ to ½ equivalent of the epoxide resin is used. As the amino-components are used in excess, the adducts contain no free epoxide groups. Preparation of the adducts can be carried out by mixing the pure components, or their solutions or their fused mass. If the pure components are mixed, care must be taken for good distribution, e.g., by stirring, and, if necessary, for the removal of heat. In the preparation of adducts in solution, heating for acceleration of the reaction is of advantage.

For coating systems which do not contain solvents, the liquid combinations can be used, which due to their viscosity—if desired after addition of means for decreasing viscosity, reaction accelerators, means for improving the flowing capacity, etc.—allow proceeding according to conventional procedures.

For preparing dispersions combinations can be used, which—after evaporation of the water—vouch for blending of the film; these are particularly the liquid combinations. Preparation of dispersions takes place in a manner known by itself; thereby, resin and hardening agent can be dispersed separately and subsequently mixed. However, it is particularly advantageous to first mix the two components and subsequently disperse them.

Solid adducts according to the invention, which can be pulverized, are particularly suitable for being processed according to the whirling-sinter-process with powder sprayers, electrostatic powder-sprayers and as hot-setting adhesive. Such processes are disclosed in the DBP 972,650, 933,019, DAS 1,005,413, 1,125,257.

EXAMPLE 1

24 parts by weight of a polyepoxide (epoxy-value 0.52) from 100 parts by weight of bis(4-hydroxyphenyl-dimethyl-methane and 81 parts by weight of epichlorhydrin which is modified by 2.4 parts of butylglycidylether, are mixed with 10 parts by weight of phenol liquefied by warming, whereupon 7 parts by weight of triethanolamine are added. Into this mixture 100 parts by weight of a poly-amino-imidazoline (amine number 375) from dimeric fatty acid and triethylene-tetramine are stirred in, whereby the formation of the adduct is initiated. Thereby the mass was stirred and cooled in order to avoid overheating.

Said poly-amino-imidazoline was prepared from 100 parts of dimerized tall oil fatty acid and 53 parts of triethylenetetramine under the conditions described in Example 1 of U.S. Patent 3,002,941. (Amine number 375.)

As soon as after completion of the reaction the temperature becomes lower, preferably at about 50° C., 10 parts of a solution of urea-formaldehyde resin in butanol-xylene of a concentration of about 70%, are stirred in, in order to improve flowing. As an end product 151 parts by weight of a hardening agent mixture, which is stable in storage, are obtained. This product is mixed with 186 parts by weight of the above described polyepoxide and the result is a lacquer free from solvents, which is immediately ready for use.

A coating prepared with this material shows an unobjectionable flowing and after 24 hours of curing at 20° C. and 65% relative humidity of the air, a hard glossy surface free from tackiness and slime is formed.

EXAMPLE 2

80 parts by weight of a poly-amino-imidazoline described in the above Example 1, are mixed with 19.8 parts by weight of a polyepoxide in the manner described in said Example 1. After the reaction dies down, 3.0 parts by weight of glacial acetic acid are added under stirring. Subsequently, to this product 8 parts by weight of a urea-formaldehyde resin solution as used in the above Example 1, 2 parts by weight of ethyleneglycolmonomethylether—hereinafter shortly denoted ethylglycol—and 10 parts by weight of a mixture of aromatic hydrocarbons and 10 parts of n-butanol are added whereby a stable, storage-resistant, dispersible curing agent, in which means for improving flowing is incorporated, is obtained.

46 parts of this curing agent are mixed with 54 parts of an un-modified polyepoxide from bis-(4-hydroxyphenyl)-dimethylmethane and epichlorhydrin. To the mixture 300 parts of water are added. Upon moderately fast stirring, a stable aqueous dispersion is formed, which has a pot life of about 24 hours.

A coating prepared with this two-component dispersion and hardened or cured at ordinary room temperature, e.g. 20° C., exhibits a clear, glossy and hard surface which is free from tackiness and smear.

EXAMPLE 3

160 parts by weight of a poly-amino-imidazoline as described in the above Example 1, are mixed with 252 parts by weight of a solution of 50% of a solid polyepoxide from bis-(4-hydroxyphenyl)-dimethylmethane and epichlorhydrin having an epoxy-value of 0.2 in a mixture of xylene and methylisobutylketone (in the proportion by weight of 1:1) and 200 parts by weight of a mixture of xylol/ethylglycol (4:1) and boiled under reflux for one hour or allowed to stand for 8 days, whereby the adduct is formed. By addition of 233.5 parts by weight of a 50% solution of the above described polyepoxide, a lacquer containing a solvent and having a pot life of 1–2 days is obtained.

Coatings of a thickness of about 30μ, prepared with this lacquer, are free from tackiness after storage at 20° C. and they attain their final hardness after 2–3 days.

The hardness according to Buchholz amounts to 95 and the Erichsen-deepening 9.5 to 10.5 mm.

EXAMPLE 4

This example is carried out in the manner disclosed in the above Example 1, with the only difference that instead of the 100 parts by weight of poly-amino-imidazoline, 100 parts by weight of a polyaminoamide from dimeric fatty acid and from a mixture of triethylene-tetramine and tetraethylene-pentamine is used. This polyaminoamide has an amine number of 300 and is prepared from 87 parts of dimerized tall oil fatty acid and a mixture of 37 parts of triethylenetetramine and 15 parts tetraethylenepentamine under the conditions of Example 1 of U.S. Patent 2,881,194.

151 parts by weight of a curing agent mixture capable of storage are thus obtained, which can be mixed before use with 168 parts by weight of a polyepoxide, in the manner described in the above Example 1 to a lacquer free from solvent. Coatings with this lacquer show very good flowing and after 24 hours storage at 20° C. and 85% relative humidity of the air, a hard, smooth surface, the gloss of which can be further improved by washing off with water, is obtained.

EXAMPLE 5

This example is carried out as described in the above Example 2, but instead of the poly-amino-imidazoline, 80 parts by weight of a poly-amino-amide prepared, as described in Example 4, from dimeric fatty acid and a mixture of triethylenetetramine and tetraethylenepentamine are used, in the proportion of 37:15. (Amine number 305.)

EXAMPLE 6

220 parts by weight of 60% solution in xylene and ethylglycol (proportion by weight 4:1) of a polyaminoamide is first prepared. This polyaminoamide has an amine number of 215 and is prepared from 87 parts of dimerized tall oil fatty acid and 37 parts of triethylenetetramine under the conditions of Example 5 of U.S. Patent No. 2,705,223. Said solution of the polyaminoamide is mixed with 284 parts by weight of the same solvent mixture and 98.8 parts by weight of a 50% solution in xylene and methylisobutylketone (proportion by weight of 1:1) of a solid polyepoxide prepared from bis(4-hydroxyphenyl)-dimethylmethane and epichlorhydrin, and having an epoxy-value of 0.2, and boiled under reflux for 1 hour or allowed to stand at ordinary room temperature for 8 days.

100 parts by weight of this curing agent solution are mixed with 65.5 parts by weight of a 50% polyepoxide solution, as described above. A lacquer solution having a pot life of 1–2 days is thereby formed.

A coating produced with this solution is upon storage at 20° C., free from tackiness after 1–2 hours and attains its final hardness after 2–3 days.

EXAMPLE 7

To 35 parts by weight of a polyaminoamide (amine number 430) prepared by condensation from 100 parts of tall-oil fatty acid and 60 parts of tetraethylenepentamine, 65 parts by weight of 50% solution of xylene/methylisobutylketone (1:1) of a polyepoxide prepared from bis(4-hydroxyphenyl)dimethylmethane and epichlorhydrin, and having an epoxy-value of 0.2, 200 parts by weight of the solvent-mixture xylene-ethylglycol (4:1) are added and kept boiling under reflux for one hour. From 100 parts by weight of this adduct and 197.5 parts by weight of the 50% polyepoxide solution used above, a lacquer ready for use is obtained.

EXAMPLE 8

35 parts by weight of poly-amino-imidazoline (amine number 370) were prepared from 100 parts of tall-oil fatty acid and 54 parts of triethylenetetramine under the conditions of Example 2 of British Patent 865,656. 65 parts by weight of a 50% solution in xylene/methylisobutylketone (1:1) of a polyepoxide prepared from bis(4-hydroxyphenyl)dimethylmethane and epichlorhydrin, and having an epoxide-value of 0.2 and 85 parts by weight of the solvent mixture xylene-ethylglycol (4:1) are boiled for 1 hour under reflux. If to 100 parts by weight of this adduct 197.5 parts by weight of the above described polyepoxide solution are added, a lacquer ready for use is obtained.

EXAMPLE 9

25 parts by weight of a poly-amino-amide (amine number 121) prepared from 50 parts of an oleic acid-maleic acid anhydride-adduct and 12.5 parts of triethylenetetramine according to Example 6 of British Patent 956,709 are dissolved in 25 parts of a solvent mixture of xylene-ethylglycol (4:1) and to the resulting product the following ingredients are added:

6.6 parts of a 50% solution of a polyepoxide from bis(4-hydroxyphenyl)dimethylmethane and epichlorhydrin having an epoxy-value of 0.2, in xylene/methylisobutylketone (1:1),
38.4 parts of a solvent mixture from xylene/ethylglycol (4:1).

The resulting mixture is boiled under reflux for one hour. To 50 parts of this solution of the adduct, 65.6 parts of a 50% solution of the above polyepoxide, are added in order to obtain a lacquer ready for use.

EXAMPLE 10

105 parts of a polyaminoimidazoline prepared as described in the above Example 1,
39 p.b.w. of a 50% solution of a polyepoxide from a phenol-formaldehyde condensate and epichlorhydrin in xylene/methylisobutylketone (1:1) and
150 p.b.w. of the solvent mixture xylene/ethylglycol (4:1) and
20 p.b.w. propanol.

are subjected to a preliminary reaction at boiling temperature for one hour. To 50 parts of this solution, 161 parts of a 50% solution of a polyepoxide on the basis of bis(4-hydroxyphenyl) dimethylmethane and epichlorhydrin having an epoxy-value of 0.2 in xylene/methylisobutylketone (1:1) are added and thereby a clear lacquer ready for use is obtained.

EXAMPLE 11

50 p.b.w. of a poly-amino-imidazoline from the $C_{19}$-dicarboxylic acid which can be obtained by carboxylation of 200 parts of oleic acid, and 200 parts of tetraethylenepentamine, according to Example 1 of U.S. Patent No. 2,966,478, 15 parts of a polyepoxide modified with butylglycidylether (1.5 parts) from bis(4-hydroxyphenyl)-dimethylmethane and epichlorhydrin, 6 parts of urea-formaldehyde resin, 1 part of ethylglycol, 7 parts of a mixture of aromatic hydrocarbons and 6 parts of n-butanol, are heated to boiling under reflux for one hour. In order to obtain a coating system which is ready for use and is poor in solvents, 50 p.b.w. of this adduct are mixed with 79.5 parts of the above mentioned modified polyepoxide.

EXAMPLE 12

80 parts of a poly-amino-amide prepared as described in the above Example 7 from tall oil fatty acid and tetraethylenepentamine, 20 parts of a liquid polyepoxide from bis(4-hydroxyphenyl)dimethylmethane (100 parts by weight) and epichlorhydrin, (81 parts by weight), 3 parts of glacial acetic acid, 2 p.b.w. ethylglycol and 10 parts of a mixture of aromatic hydrocarbons and 10 parts of n-butanol, said polyepoxide being modified by 2 parts of butylglycidylether, are subjected to a preliminary reaction at boiling temperature for an hour. After cooling to 60° C., 8 parts by weight of urea formaldehyde resin are stirred in. A dispersion lacquer can be obtained by dispersing 46 parts of this product with 54 parts of an unmodified liquid polyepoxide from bis(4-hydroxyphenyl)-dimethylmethane and epichlorhydrin in water.

EXAMPLE 13

20 parts of a polyepoxide from bis(4-hydroxyphenyl) dimethylmethane (100 parts by weight) and epichlorhydrin (81 parts by weight), said polyepoxide being modified with butylglycidylether, 10 parts of phenol, 7 parts of triethanolamine and 100 p.b.w. of poly-amino-imidazoline prepared as described in the above Example 11, are heated to 100° C. for one hour. After cooling, 16 parts by weight of urea-formaldehyde resin are mixed in. To 20 parts by weight of this adduct 35.7 p.b.w. of the above described polyepoxide modified with butylglyicylether are added, whereby a coating composition free from solvent is obtained.

EXAMPLE 14

33 parts of a polyepoxide from bis(4-hydroxyphenyl) dimethylmethane and epichlorhydrin, having an epoxy-value of 0.2 are molten at 125° C. and then mixed under vigorous stirring with 48 parts of the poly-amino-imidazoline described in the above Example 1. After 15 minutes at 125° C., the reaction is completed. The resin which is still liquid at this temperature solidifies on cooling and can be ground then. 20 parts of this finely ground adduct yield with 54 parts of the above described finely ground polyepoxide from bis(4-hydroxyphenyl)dimethyl-methane and epichlorhydrin, having an epoxy-value of 0.2 a sinter powder ready for use. By immersing an iron rod heated to about 200° C. in the sinter powder which has been whirled according to the conventional whirling process and subsequent curing of the coating for ½ hour at 130° C., a smooth hard coating resistant to chemicals and solvents is obtained.

EXAMPLE 15

10 parts of a polyepoxide prepared from 100 parts of glycerin and 300 parts of epichlorhydrin and having an epoxy value of 0.62, 7 parts of triethanolamine and 100 parts of a poly-amino-imidazoline described in the above Example 1 are subjected to a preliminary reaction at 100° C. and after cooling 16 parts of urea-formaldehyde resin in butanol-xylene (60:40) are added. A coating composition ready for use and free from solvents is prepared from 143 parts of this product and 140 parts of the above described polyepoxide.

EXAMPLE 16

A mixture of 80 parts of a poly-amino-imidazoline described in the above Example 1, 12 parts of polyepoxide from glycerin and epichlorhydrin having the epoxy value 0.62, 2 parts of ethylglycol, 10 parts of a mixture of isomeric trimethylbenzenes, 10 parts of n-butanol and 8 parts by weight of urea-formaldehyde resin in solution of 70% in butanol/xylene, are kept boiling under constant stirring until gelatinization of the mixture occurs. Subsequently 200 ml. of a solvent mixture of xylol-ethylglycol (4:1) is added and mixed up by stirring, whereby the reaction mass becomes fluid again. In order to obtain a lacquer ready for use, the following ingredients are added to 29.4 parts of this solution: 75.6 parts of a 50% solution of a polyepoxide from bis - (4 - hydroxyphenyl)dimethyl-methane and epichlorhydrin, having an epoxy-value of 0.2 in xylene/methyl-isobutyl ketone (1:1).

It will be understood from the above that the present invention can be carried out with various modifications. The curing agents embodying the invention consist of adducts of polyepoxide resins which have an epoxy-value in the range of 0.2–0.62, the epoxy-value being defined as mol-epoxide groups per 100 g. of the resin. The adducts are formed of a stoichiometric excess amount of poly-amino-amides and/or polyaminoimidazolines, said stoichiometric excess amounting to 1 equivalent per ¼ to ¹⁄₁₂ equivalent of the polyepoxide resin. The dimerized tall-oil fatty acid is prepared—in a manner known per se—by polymerizing tall-oil fatty acid—which is a mixture of oleic acid and linoleic acid—by heating in the presence of catalytically acting clays. The "dimeric fatty acid" is used, e.g. in the above Examples 1, 4, 5, 6, while the term "tall-oil fatty acid" (mentioned e.g. in Examples 7 and 8) denotes the unchanged tall-oil fatty acid. The abbreviation "p.b.w." stands for "parts by weight." The term "mixture of aromatic hydrocarbons" denotes a mixture of isomeric tri-methylbenzenes. In the preparation of the polyepoxide in the above Example 14, the bis-(4-hydroxyphenyl)-dimethylmethane and the epichlorhydrin are reacted in a proportion of 100 parts and 53 parts.

The proportion of pulverulent polyepoxide and pulverulent hardening agent are determined from the equivalent weights of these components, i.e. the epoxide equivalent of the polyepoxide and the equivalent of active H of the hardening agent. In general, proportions are used in which per epoxide-equivalent an equivalent of active H's is present. However, in order to attain particular degrees of hardness or flexibility, it is also possible to use more or less than the equivalent amount of the hardening agent. Hardening may be carried out at elevated temperatures, e.g. 40 to 250° C., or at ordinary room temperature, as shown by the above examples. The particle size of the pulverulent material is preferably in the range of 0.1 to 0.3 mm. and the pulverulent materials are intimately mixed prior to their processing. The parts and percent stated herein are by weight if not otherwise stated. The term "moderately fast stirring" is used herein to denote stirring up to 60 revolutions per minute. The abbreviation "DBP" stands herein for "Deutsches Bundes-Patent." The term Buchholz-hardness denotes the result of a method of determining hardness according to DIN (German Industrial Standardization) 53,153 and the Erichson-Tiefung denotes the result of a measuring method according to DIN 53,156.

The Belgian Patent No. 593,299 describes the preparation of N-aminoalkylamides and N-aminoalkylimidazolines and these compounds are reacted according to said Belgian patent directly with epoxide resins. In contrast hereto, according to the present invention said compounds described in the Belgian patent are first reacted with epoxide resins to form adducts in the manner disclosed herein and these adducts are used as hardening agents for epoxide resins.

The substances denoted "N-aminoalkylamide" and "N-aminoalkylimidazoline" in said Belgian patent, have been denoted "polyaminoamide" and "polyaminoimidazoaline," respectively, in the present application.

In the preparation of the polyepoxides in the above examples the following proportions of the polyphenol and epichlorhydrin are used. In the preparation of the polyepoxide with the epoxide value of 0.52 are reacted:

100 parts of bis(4-hydroxy-phenyl)-dimethyl-methan and 81 parts of epichlorhydrin;

in the preparation of the polyepoxide with the epoxide value of 0.2 are reacted:

100 parts of bis(4-hydroxy-phenyl)-dimethyl-methan and 53 parts of epichlorhydrin.

The phenol-formaldehyde condensate mentioned in Example 10 is a novolac type resin, 100 parts of which are reacted with 50 parts of epichlorhydrin.

It will be understood from the tbove that the curing agents embodying this invention are liquid or soluble in lacquer solvents and fusible when in solid form. As lacquer solvents mixtures of alcohols and aromatic hydrocarbons can be used.

What is claimed is:

1. Curing agent for polyepoxide resins containing more than one epoxy group per molecule, said epoxy resins being polyglycidylethers of aromatic and aliphatic polyvalent hydroxyl compounds and epoxide compounds obtained by epoxidization of aliphatic and cycloaliphatic polyolefins, said curing agent consisting essentially of an adduct containing free amino-groups and being formed by reacting said polyepoxide resins as defined above and which have an epoxy value in the range of 0.2–0.62 and contain more than one epoxy group per molecule and a stoichiometric excess amount of a substance selected from the group consisting of polyaminoamides and polyaminoimidazolines based on a carboxyl-bearing compound containing a fatty chain member; said stoichiometric excess of the amino-compound amounting to one equivalent thereof per ¼ to ¹⁄₁₂ equivalent of said polyepoxide resins; the members of said group of poly-amino-amides and poly-amino-imidazolines being based on a fatty acid selected from the group consisting of saturated monovalent natural fatty acids, unsaturated monovalent natural fatty acids, dimeric fatty acids, polymeric fatty acids, copolymeric fatty acids and polycarboxylic acids obtainable by addition of dicarboxylic acids, addition of tricarboxylic acids, derivatives of these dicarboxylic acids, derivatives of said tricarboxylic acids, by addition of maleic acid anhydride to natural unsaturated fatty acids.

2. Process for curing polyepoxides containing more than one epoxy group in the molecule, said polyepoxides being polyglycidylethers of aromatic and aliphatic polyvalent hydroxyl compounds and epoxide compounds obtained by epoxidization of aliphatic and cycloaliphatic polyolefins, comprising mixing the polyepoxides to be used with adducts formed by reacting said polyepoxides as defined above and having an epoxy equivalent in the range of 0.2 to 0.62, and a stoichiometric excess of a substance selected from the group consisting of polyaminoamides and polyamino-imidazolines, based on a carboxyl-bearing compound containing a fatty chain member, said stoichiometric excess of the amino compound amounting to one equivalent thereof per ¼ to ¹⁄₁₂ equivalent of said polyepoxide, said poly-aminoamides and polyamino-imidazolines being based on a fatty acid selected from the group consisting of saturated monovalent natural fatty acids, unsaturated monovalent natural fatty acids, dimeric fatty acids, polymeric fatty acids, copolymeric fatty acids, dicarboxylic acids obtainable by carboxylation of natural fatty acids and polycarboxylic acids obtainable by addition of dicarboxylic acids, addition of tricarboxylic acids, derivatives of these dicarboxylic acids, derivatives of these tricarboxylic acids, by addition of maleic acid anhydride to natural unsaturated fatty acids, the polyepoxides to be cured and the adducts, being used in proportions, in which per epoxide-equivalent an equivalent of active H's is present.

3. Curing agent as claimed in claim 1, in which the polyepoxides consist of polyglycidyl ethers of bis(4-hydroxy-phenyl)-dimethylmethane.

4. Process for curing polyepoxides as claimed in claim 2, in which the polyepoxides of the adduct consist of polyglycidyl ethers of bis(4-hydroxyphenyl)-dimethylmethane.

5. Curing agent as claimed in claim 1, in which the polyamino-amides and polyamino-imidazolines are based on di- and polymeric fatty acids.

6. Polyepoxide compositions essentially consisting of epoxy resins containing more than one epoxy-group in the molecule, said polyepoxide being polyglycidylethers of aromatic and aliphatic polyvalent hydroxyl compounds and epoxide compounds obtained by epoxydization of aliphatic and cycloaliphatic polyolefins, and an adduct formed by reacting said polyepoxides which have an epoxy-value in the range of 0.2–0.62 and a stoichiometric excess of a substance selected from the group consisting of polyaminoamides and polyamino-imidazolines based on a carboxyl-bearing compound containing a fatty chain member, said stoichiometric excess of the amino compound amounting to one equivalent thereof per 1/4–1/12 equivalent of said polyepoxide, said poly-aminoamides and polyamino-imidazolines being based on a fatty acid selected from the group consisting of saturated monovalent natural fatty acids, unsaturated monovalent natural fatty acids, dimeric fatty acids, polymeric fatty acids, copolymeric fatty acids, dicarboxylic acids obtainable by carboxylation of natural fatty acids and polycarboxylic acids obtainable by addition of dicarboxylic acids, addition of tricarboxylic acids, derivatives of these dicarboxylic acids, derivatives of these tricarboxylic acids, by addition of maleic acid anhydride to natural unsaturated fatty acids, said compositions essentially consisting of solid pulverized polyepoxides in mixture with a solid pulverized curing agent, and being stable on storage and hardenable by heat.

7. Curing agent as claimed in claim 3, in which the polyepoxide is a polyglycidyl ether of a hydroxyl compound, in which the polyepoxide is a polyglycidyl ether of a hydroxyl compound selected from the group consisting of bis(4-hydroxyphenyl)-dimethylmethane, resorcin, pyrocatechin, hydroquinone, dihydroxydiphenylsulfide, glycerol, pentaerythrite, mannitol, sorbite and trimethylolpropane.

8. A process as claimed in claim 2, in which an excess of the adduct, relative to the amount of the polyepoxides is used.

9. A process as claimed in claim 2, in which less than the equivalent amount of the adduct relative to the amount of the polyepoxides is used.

10. A process as claimed in claim 4, in which the polyepoxides to be cured consist of polyglycidyl ethers of bis(4-hydroxyphenyl)-dimethylmethane.

References Cited

UNITED STATES PATENTS

| 3,280,054 | 10/1966 | Gotze et al. | 260—18 |
| 2,867,592 | 1/1959 | Morris et al. | 260—18 |
| 2,651,589 | 9/1953 | Shokal et al. | 260—47 X |

DONALD E. CZAJA, Primary Examiner

C. WARREN IVY, Assistant Examiner

U.S. Cl. X.R.

260—21, 29.4, 830, 834